United States Patent
Sell

(10) Patent No.: US 11,060,622 B2
(45) Date of Patent: Jul. 13, 2021

(54) CARTRIDGE HAVING A PRESSURIZED CONTROL DISK FOR A WATER FITTING

(71) Applicant: QL Thermostatic Limited, Tauranga (NZ)

(72) Inventor: Matthias Sell, Walhausen (DE)

(73) Assignee: QL Thermostatic Limited, Tauranga (NZ)

( * ) Notice: Subject to any disclaimer, the term of this patent is extended or adjusted under 35 U.S.C. 154(b) by 0 days.

(21) Appl. No.: 16/321,207

(22) PCT Filed: Jul. 13, 2017

(86) PCT No.: PCT/EP2017/067712
§ 371 (c)(1),
(2) Date: Jan. 28, 2019

(87) PCT Pub. No.: WO2018/019603
PCT Pub. Date: Feb. 1, 2018

(65) Prior Publication Data
US 2019/0170263 A1   Jun. 6, 2019

(30) Foreign Application Priority Data

Jul. 29, 2016   (DE) ............ 10 2016 213 991.6
Aug. 3, 2016    (DE) ............ 10 2016 214 311.5

(51) Int. Cl.
*F16K 11/078*   (2006.01)
(52) U.S. Cl.
CPC .................. *F16K 11/0787* (2013.01)

(58) Field of Classification Search
CPC .................. F16K 11/0787; F16K 11/0782
See application file for complete search history.

(56) References Cited

U.S. PATENT DOCUMENTS

| | | | |
|---|---|---|---|
| 3,920,043 A | | 11/1975 | Fowell |
| 4,301,836 A | * | 11/1981 | Hunziker ............ F16K 11/0787 137/625.4 |
| 4,375,824 A | * | 3/1983 | von Borries ............ F16K 47/02 137/614.17 |
| 8,695,635 B1 | | 4/2014 | Wang |
| 2006/0162793 A1 | | 7/2006 | Di Nunzio |
| 2011/0308652 A1 | | 12/2011 | Rosko et al. |

FOREIGN PATENT DOCUMENTS

WO    2009/091135 A2    7/2009

OTHER PUBLICATIONS

International Search Report for PCT/EP2017/067712, dated Oct. 17, 2017, and English Translation submitted herewith (7 pgs.).

* cited by examiner

*Primary Examiner* — Michael R Reid
(74) *Attorney, Agent, or Firm* — The Webb Law Firm

(57) ABSTRACT

The invention relates to a cartridge (1) for a water fitting having a stationary bearing disk (2) on which a rotatable ceramic control disk (3) is placed and on which control disk (3) a sliding disk (4) made in particular of plastics material is located.
In order that no leaking water can escape from the cartridge (1) even at high water pressure, it is proposed that the control disk (3) is pressed against the stationary bearing disk (2) by a pressure element.

1 Claim, 6 Drawing Sheets

CARTRIDGE HAVING A PRESSURIZED CONTROL DISK FOR A WATER FITTING

CROSS-REFERENCE TO RELATED APPLICATIONS

This application is a U.S. national phase application filed under 35 U.S.C. § 371 of International Application No. PCT/EP2017/067712, filed Jul. 13, 2017, designating the United States, which claims priority from German Patent Application No. 10 2016 213 991.6, filed Jul. 29, 2016, and German Patent Application No. 10 2016 214 311.5, filed Aug. 3, 2016, which are hereby incorporated herein by reference in their entirety.

The invention relates to a cartridge for a water fitting having a stationary bearing disk on which a rotatable ceramic control disk is placed and on which control disk a sliding disk made in particular of plastics material is located.

These cartridges are used for water fittings for sanitary facilities, in particular for scald-protection cartridges having an integrated safety and comfort function for the end user.

Cartridges for water fittings are known which comprise, inter alia, a stationary ceramic bearing disk on which a rotatable ceramic control disk having a mixing chamber for cold and hot water is placed. A sliding disk made of plastics material is located on the control disk.

At a very high water pressure, e.g. 34.5 bar, the ceramic control disk may lift slightly apart from the stationary bearing disk. At these high pressure loads, the two ceramic disks lift apart from one another due to the inconveniently placed surfaces. As a result, leaking water escapes from the cartridge.

The object of the invention is to prevent this, so that no leaking water can escape from the cartridge even at high water pressure.

According to the invention, this object is achieved by the features of claim 1.

In order to counteract lifting of the control disk from the bearing disk, the design of the hydraulic surfaces of the disks is modified such that said disks are always pressed together.

In the inventive embodiment, the control disk is pressed against the stationary bearing disk by a pressure element. The pressure of the pressure element must be selected such that lifting is not possible.

The pressure element may be a spring or the water pressure located in the mixing chamber of the control disk or the water pressure applied to the cartridge. A spring has the disadvantage that the pressure on the control disk remains constant, i.e. even at low water pressure. This makes adjustment harder at low water pressures. If, however, the water pressure applied to the cartridge is the pressure element, the pressure at lower water pressures is also lower than at high water pressures. This makes adjustment easier at low water pressures.

In a preferred embodiment, the control disk comprises a through-hole which guides the water located in the cartridge or in the mixing chamber of the control disk into a pressure chamber between the control disk and the sliding disk and therefore presses the control disk against the bearing disk. The pressure chamber is sealed horizontally by a molded seal. In this case, one side of the pressure chamber directly or indirectly forms the control disk, such that the water located in the pressure chamber presses the control disk towards the bearing disk by means of a force that is dependent on the water pressure.

The sliding disk is totally sealed, so that no water can escape through the sliding disk.

The molded seal is preferably arranged in a groove in the control disk or the sliding disk, preferably in the control disk.

A method according to the invention for operating a cartridge having a stationary bearing disk on which a rotatable ceramic control disk is placed and on which control disk a sliding disk made of plastics material is located is characterized in that a pressure chamber is arranged between the control disk and the sliding disk, one side of the pressure chamber directly or indirectly forming the control disk and the control disk comprising a through-hole which guides water located in the cartridge into the pressure chamber between the control disk and the sliding disk, and it being easier to adjust the cartridge at lower pressures than at high water pressures due to the water pressure applied to the cartridge pressing the control disk against the stationary bearing disk.

The invention is explained further in the following with reference to drawings. The following drawings also show the problems until the optimized product is reached.

Figure 1:
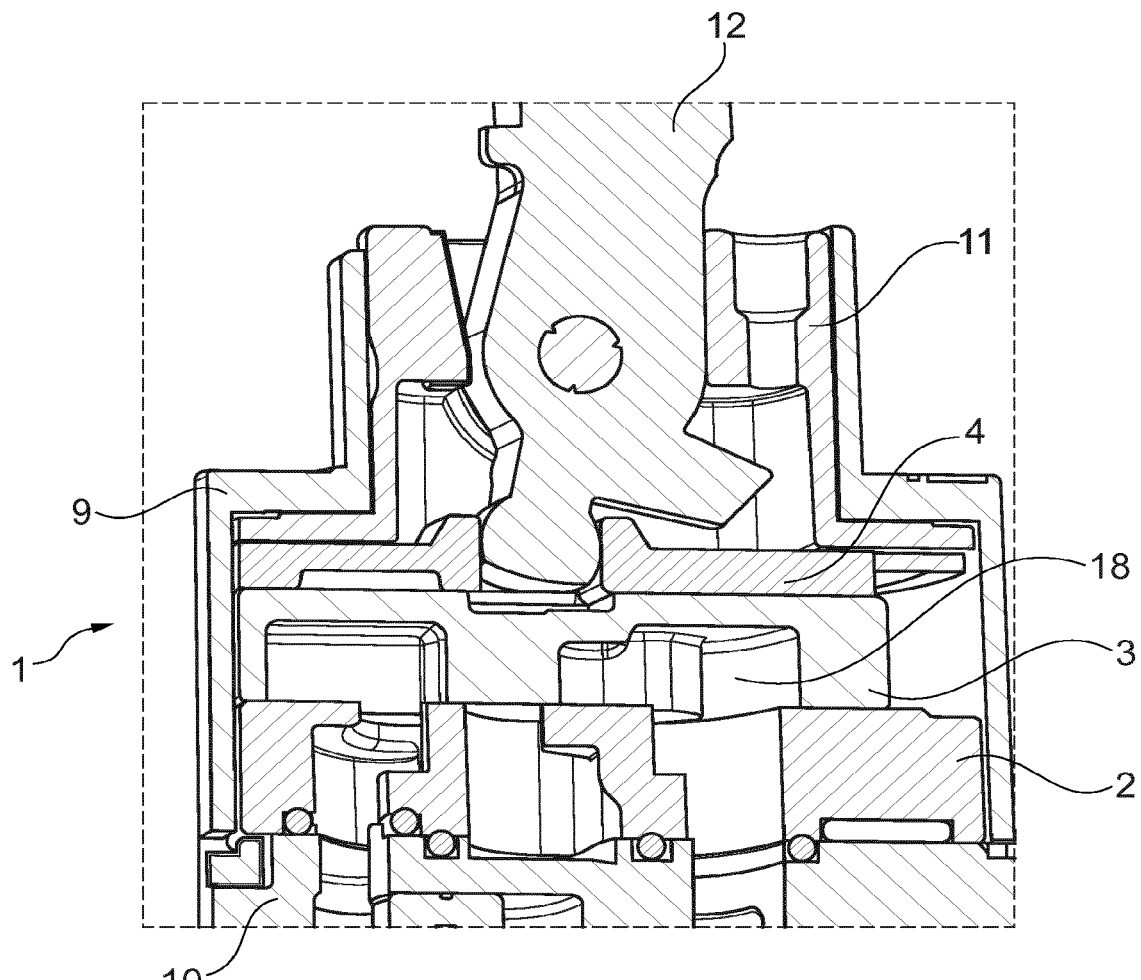
FIG. 1 is a cross-sectional view of a cartridge for a water fitting according to the prior art.

FIG. 1 shows the cartridge 1 according to the prior art. The upper part of a cartridge can be seen. A stationary ceramic bearing disk 2 is arranged on a base plate 10 having inlet flanges for cold and hot water and an outlet flange for mixed water. A movable control disk 3 rests on said bearing disk 2. A sliding disk 4 rigidly connected to the control disk 3 is located on said disk, with which sliding disk an end of a pivot 12 engages. The pivot 12 is rotatably and pivotably mounted in a bearing bushing 11. The entire assembly is located in a housing 9. Passages for the water (cold, hot or mixed) are located, as is conventional, in the base plate 10 and the bearing disk 2. The control disk 3 is sealed at the top, i.e. towards the sliding disk 4, and comprises at least one mixing chamber 18 for the cold and hot water.

Figure 2:
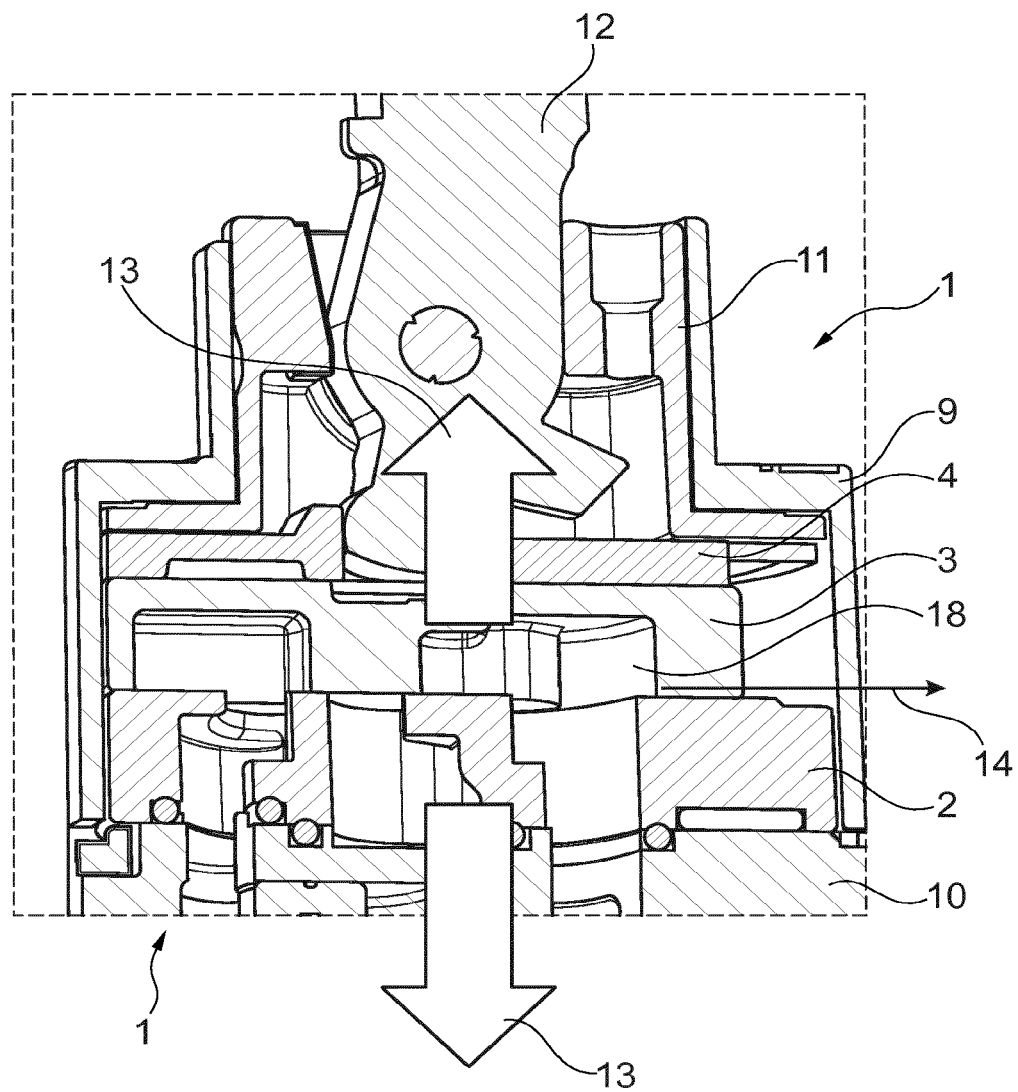
FIG. 2 is a cross-sectional view of the cartridge of FIG. 1 during a high pressure load.

FIG. 2 shows the problems at a high pressure load, i.e. at high water pressure in the cold or hot water supply. At a pressure load, there is high pressure between the bearing disk 2 and the control disk 3 and said disks lift apart from one another (see arrow 13), such that there is leakage or a leak and leaking water can escape from the cartridge (see arrow 14).

Theoretical Approach:

It must be ensured that the control disk 3 is not pressed upwards, but is guided downwards to the base disk 2. The control disk 3 must also be subjected to pressure from above, preferably water pressure.

Figure 3:
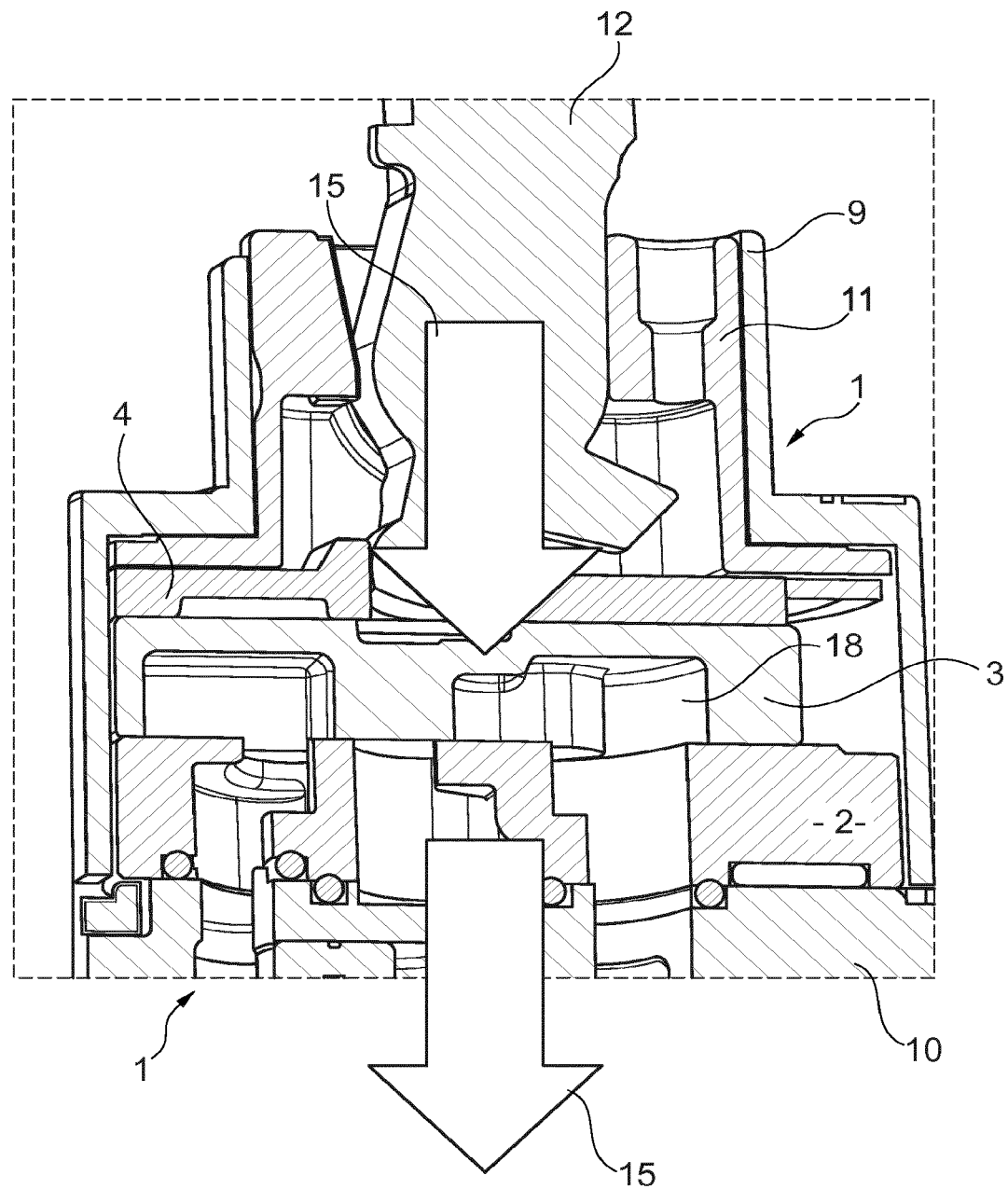
FIG. 3 is a cross-sectional view of the cartridge of FIG. 1 with the control disk subjected to pressure from above.

FIG. 3 shows this theoretical approach using the arrows 15. Otherwise, like reference signs denote like parts.

Figure 4:
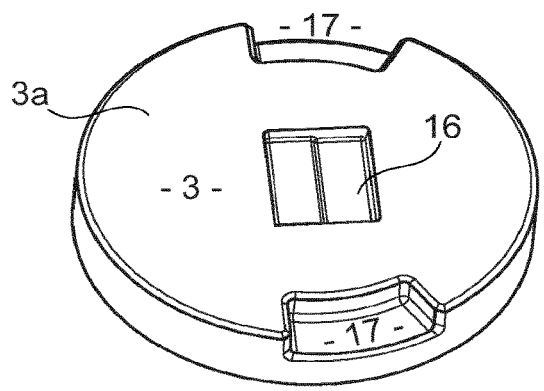
FIG. 4 is a perspective view of a control disk of the cartridge of FIG. 1 from the pivot side of the control disk.
Figure 5:
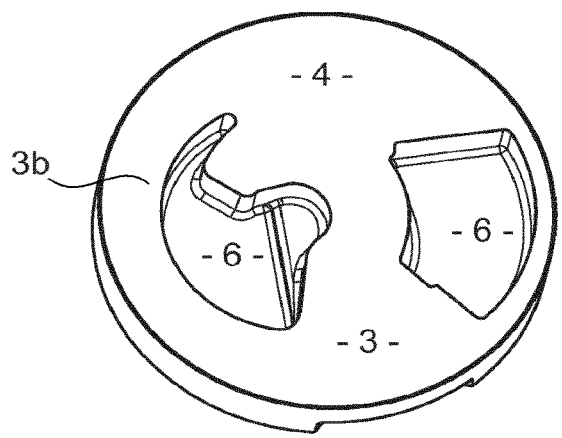
FIG. 5 is a perspective view of the control disk of FIG. 4 from the bearing disk side of the control disk.

FIG. 4 shows a control disk 3 according to the prior art, as shown in FIGS. 1 to 3, from above, i.e. from the pivot side, and FIG. 5 shows the same control disk 3 according to the prior art, as shown in FIGS. 1 to 3, from below, i.e. from the bearing disk side.

As can be seen in FIG. 4, the control disk comprises, on the pivot side 3a, a recess 16 in the center of the disk and two notches 17 on the edge of the disk. A bulge on the sliding disk 4 adapted to the recess 16 protrudes into the recess. Catches on the sliding disk 4 adapted to the notches 17 protrude into said notches. This is necessary because the sliding disk 4, controlled by the pivot 12, guides the control disk 3.

FIG. 5 shows the mixing chambers 18 on the bearing disk side 3b of the control disk 3.

Constructive Approach:

The control disk 3 must be provided with a through-hole so that water pressure can act from above. Furthermore, a molded seal between the control disk and the sliding disk 4 is necessary. The sliding disk 4 must also be sealed.

Figure 6:
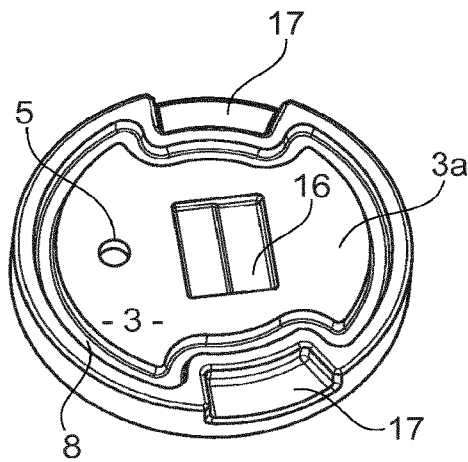
FIG. 6 is a perspective view of a control disk according to the invention from the pivot side of the control disk.
Figure 7:
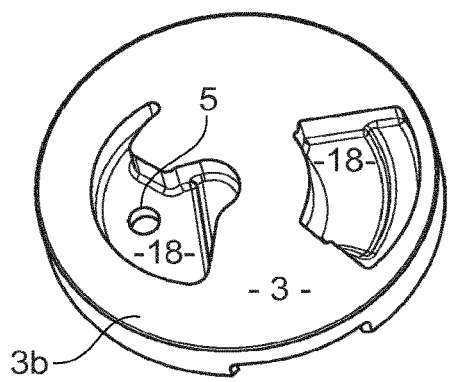
FIG. 7 is a perspective view of the control disk of FIG. 6 from the bearing disk side of the control disk.
Figure 8:
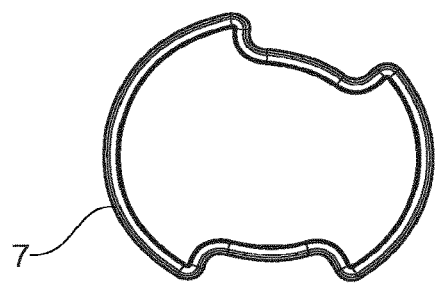
FIG. 8 is a top view of a molded seal of the control disk of FIG. 6.

FIGS. 6 to 8 show these modifications according to the invention to the control disk 3.

FIG. 6 shows the control disk 3 according to the invention from the pivot side 3a having the conventional recess 16 and the notches 17. In addition, a peripheral groove 8 is located next to the edge of the disk 3. A molded seal 7 is inserted into said groove 8, as shown in FIG. 8. This molded seal 7 is necessary because a through-hole 5 is arranged in the control disk 3 according to the invention, which through-hole connects the mixing chamber(s) 18 to the pressure chamber between the control disk 3 and the sliding disk 4. The through-hole is located inside the molded seal 7.

FIG. 7 shows the control disk 3 according to the invention from the sliding disk side 3b having the mixing chambers 18. The through-hole 5 in one of the mixing chambers 18 can be clearly seen.

FIG. 8 shows the molded seal 7 already mentioned above.

Figure 9:
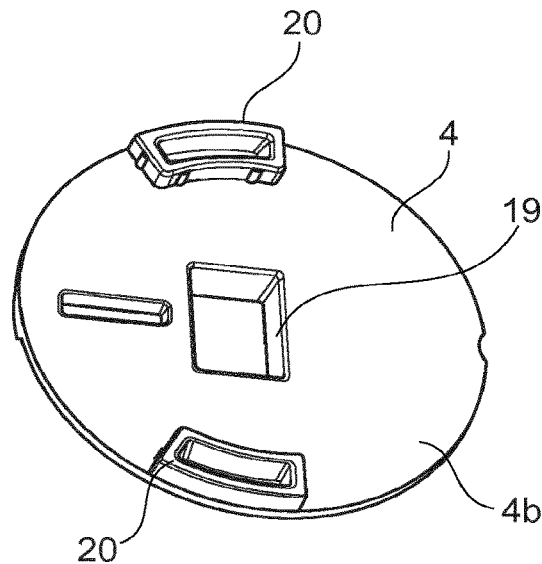
FIG. 9 is a perspective view of a sliding disk of the cartridge of FIG. 1 from the control disk side of the sliding disk.
Figure 10:
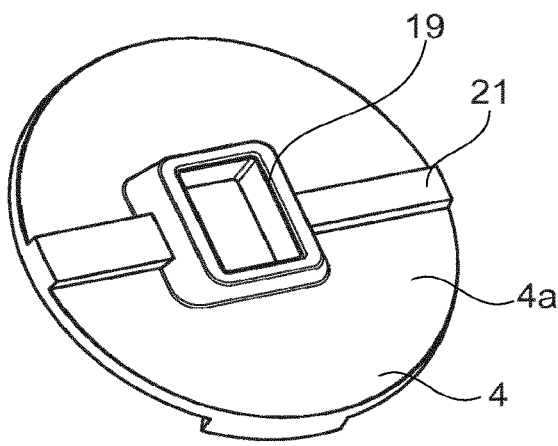
FIG. 10 is a perspective view of the sliding disk of FIG. 9 from the pivot side of the sliding disk.

FIG. 9 shows a sliding disk 4 according to the prior art, as shown in FIGS. 1 to 3, from below, i.e. from the control disk side, and FIG. 10 shows the same sliding disk 4 according to the prior art, as shown in FIGS. 1 to 3, from above, i.e. from the pivot side.

As can be seen in FIG. 9, the sliding disk 4 comprises, on the control disk side 4b, a passage 19 as a receptacle for the pivot 12. Two catches 20 for engaging with the two notches 17 (see FIG. 4) can also be seen.

FIG. 10 shows the sliding disk 4 from the pivot side having the passage 19 and a ridge 21. Two adapted grooves on the bearing bushing 11 protrude into the ridge 21. When the pivot 12 swivels, the sliding disk 4 is rotated therewith.

Figure 11:
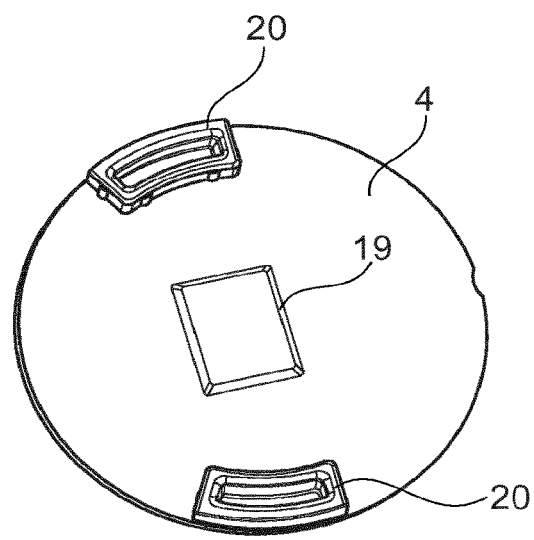
FIG. 11 is a perspective view of a sliding disk according to the invention from the control disk side of the sliding disk.
Figure 12:
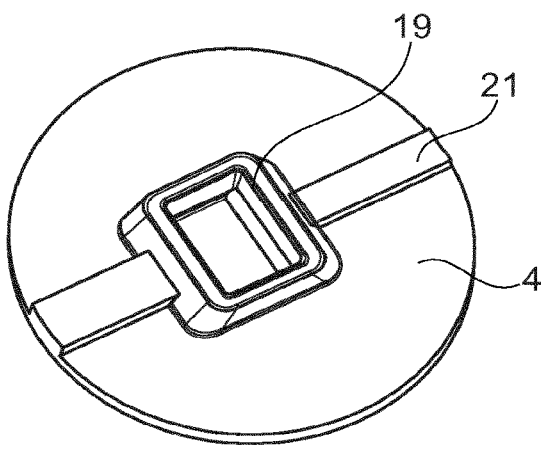
FIG. 12 is a perspective view of the sliding disk of FIG. 11 from the pivot side of the sliding disk.

FIGS. 11 and 12 show the modifications according to the invention to the sealing disk 4.

FIG. 11 shows the sliding disk 4 according to the invention from the control disk side and FIG. 12 shows the sliding disk 4 according to the invention from the pivot side. The sliding disk 4 according to the invention differs from the sliding disk 4 according to the prior art (see FIGS. 1 to 3) only by a closed passage 19, which is now a recess. There is no longer a passage.

Figure 13:
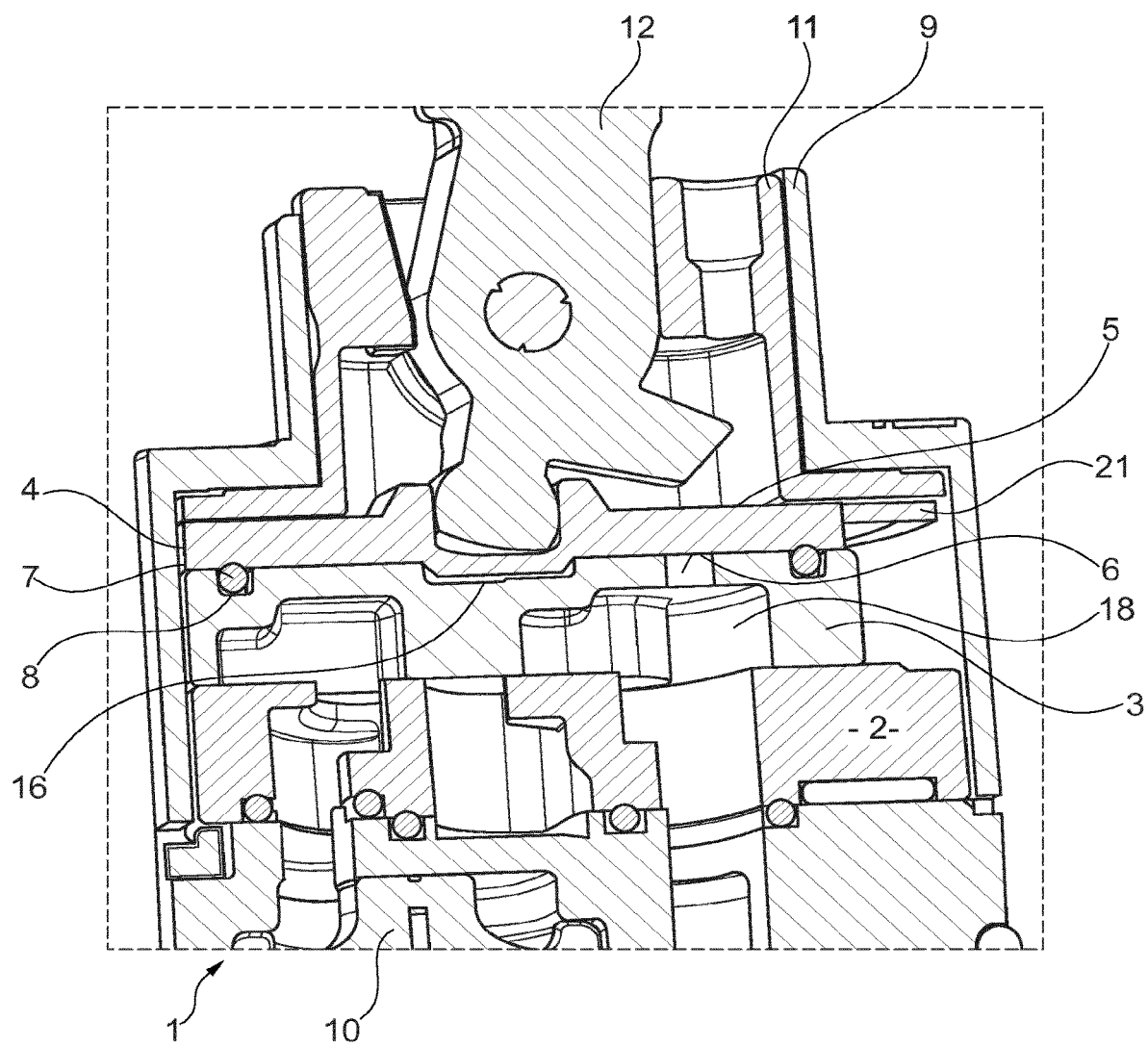
FIG. 13 is a cross-sectional view of a cartridge for a water fitting according to the invention.

FIG. 13 shows the optimized cartridge 1 according to the invention or the upper part thereof. A stationary ceramic bearing disk 2 is arranged on a base plate 10 having inlet flanges for cold and hot water and an outlet flange for mixed water. A movable control disk 3 rests on said bearing disk 2. A sliding disk 4 rigidly connected to the control disk 3 is located on said disk, with which sliding disk an end of a pivot 12 engages. The pivot 12 is rotatably and pivotably mounted in a bearing bushing 11. The entire assembly is located in a housing 9. Passages for the water (cold, hot or mixed) are located, as is conventional, in the base plate 10 and the bearing disk 2. The control disk 3 is not closed at the top, i.e. towards the sliding disk 4, but rather comprises a through-hole 5 which leads from the mixing chamber 18 into a pressure chamber 6 between the control disk 3 and the sliding disk 4. This pressure chamber 6 is closed on all sides (molded seal 7), such that no water can escape. The pressure chamber cannot be clearly seen in the drawing, because it is at only a low height. The water pressure in the pressure chamber presses the sliding disk 4 against the control disk 3, such that said sliding disk cannot lift apart. As a result, no leaking water can escape.

The invention claimed is:

1. A cartridge for a water fitting, the cartridge comprising:
  a stationary bearing disk having passages for hot, cold, and mixed water;
  a rotatable ceramic control disk placed on the stationary bearing disk, wherein a surface of the ceramic control disk facing towards the stationary bearing disk has a mixing chamber defined therein;
  a fully sealed planar sliding disk, made of plastics material, located on and rigidly connected to the ceramic control disk, the fully sealed planar sliding disk comprising a closed central recess configured to receive an end of a pivot,
  wherein a surface of the ceramic control disk facing towards the sealed planar sliding disk is sealed and comprises a peripheral groove defined therein located next to an edge thereof and notches defined in the edge, the notches being disposed peripherally outside of the peripheral groove and the peripheral groove being shaped to extend away from the edge at the notches,
  wherein the surface of the ceramic control disk facing towards the sealed planar sliding disk further comprises a planar portion disposed peripherally inside of the peripheral groove and a central recess defined therein,
  wherein a surface of the fully sealed planar sliding disk facing towards the ceramic control disk comprises projections on an edge thereof to engage with the notches of the ceramic control disk,
  wherein the surface of the fully sealed planar sliding disk facing towards the ceramic control disk further comprises a planar portion extending adjacent and parallel to the planar portion of the surface of the ceramic control disk facing towards the sealed planar sliding disk and a closed side of the closed central recess projecting from the planar portion of the fully sealed planar sliding disk, the closed side of the closed central recess of the fully sealed planar sliding disk being received in the central recess of the ceramic control disk;
  a pressure chamber defined between the surface of the planar sliding disk facing towards the ceramic control disk and the surface of the ceramic control disk facing towards the planar sliding disk, the pressure chamber being defined solely by:
  the planar portion of the surface of the ceramic control disk facing towards the fully sealed planar sliding disk;
  the planar portion of the surface of the fully sealed planar sliding disk facing towards the ceramic control disk;
  the central recess defined in the surface of the ceramic control disk facing towards the fully sealed planar sliding disk; and
  the closed side of the closed central recess of the fully sealed planar sliding disk; and
a molded seal provided in the peripheral groove of the ceramic control disk to seal the pressure chamber on all sides thereof,
wherein the ceramic control disk includes a through hole guiding water from the mixing chamber to the pressure chamber whereby water pressure in the pressure chamber presses the ceramic control disk against the stationary bearing disk.

\* \* \* \* \*